(12) United States Patent
Fagundes

(10) Patent No.: US 11,281,439 B2
(45) Date of Patent: Mar. 22, 2022

(54) SYSTEM AND METHOD FOR CREATING A CONTEXTUALIZED AFTER CALL WORKFLOW

(71) Applicant: Avaya Inc., Santa Clara, CA (US)

(72) Inventor: Luciano Godoy Fagundes, São José dos Campos (BR)

(73) Assignee: Avaya Inc., Santa Clara, CA (US)

(*) Notice: Subject to any disclaimer, the term of this patent is extended or adjusted under 35 U.S.C. 154(b) by 0 days.

(21) Appl. No.: 16/045,413

(22) Filed: Jul. 25, 2018

(65) Prior Publication Data

US 2020/0034123 A1 Jan. 30, 2020

(51) Int. Cl.
| G06F 8/38 | (2018.01) |
| G06F 3/0482 | (2013.01) |
| G06F 3/0484 | (2013.01) |
| G06F 8/34 | (2018.01) |
| G06Q 10/10 | (2012.01) |

(52) U.S. Cl.
CPC .............. G06F 8/38 (2013.01); G06F 3/0482 (2013.01); G06F 3/0484 (2013.01); G06F 8/34 (2013.01); G06Q 10/10 (2013.01)

(58) Field of Classification Search
CPC ........ G06F 8/38; G06F 3/0482; G06F 3/0484; G06Q 10/10
See application file for complete search history.

(56) References Cited

U.S. PATENT DOCUMENTS

| 6,707,903 | B2 | 3/2004 | Burok et al. |
| 6,907,569 | B1 | 6/2005 | Craft |
| 8,112,306 | B2 | 2/2012 | Lyerly et al. |
| 8,301,668 | B1 * | 10/2012 | He ........................ G06F 16/242 |
| | | | 707/804 |
| 10,630,613 | B1 * | 4/2020 | Smith ................. H04L 67/2842 |

(Continued)

FOREIGN PATENT DOCUMENTS

| CN | 101686280 | 3/2010 |
| CN | 102830964 | 12/2012 |

(Continued)

OTHER PUBLICATIONS

Lambert et al., "Microsoft Outlook 2013 Step by Step," Microsoft Press 2013.*

(Continued)

*Primary Examiner* — Ryan Barrett
(74) *Attorney, Agent, or Firm* — Sheridan Ross P.C.

(57) ABSTRACT

Data is received from one or more sensors in a first communication endpoint. The received data is related to a communication session between the first communication endpoint and at least a second communication endpoint. For example the communication session may be a voice call between the first communication endpoint and the second communication endpoint. An action, a user, and a resource are identified based on the received data. A display is generated on the first communication endpoint that presents at least one of a simplified user interface command and a simplified user interface command builder. The simplified user interface command and the simplified user interface command builder are generated based on the identified user, action, and resource.

20 Claims, 5 Drawing Sheets

(56) References Cited

U.S. PATENT DOCUMENTS

| | | | |
|---|---|---|---|
| 2007/0038499 A1* | 2/2007 | Margulies | G06Q 10/06 705/7.26 |
| 2007/0130186 A1* | 6/2007 | Ramsey | G06F 16/951 |
| 2007/0162907 A1* | 7/2007 | Herlocker | G06Q 10/10 718/100 |
| 2010/0185973 A1* | 7/2010 | Ali | G06Q 10/06 715/781 |
| 2010/0257015 A1* | 10/2010 | Molander | G06Q 10/06 705/7.21 |
| 2011/0261030 A1* | 10/2011 | Bullock | G06F 3/04842 345/204 |
| 2011/0264645 A1* | 10/2011 | Mital | G06F 16/48 707/708 |
| 2011/0268260 A1 | 11/2011 | Madhavapeddi et al. | |
| 2012/0011239 A1* | 1/2012 | Svane | G06Q 10/10 709/223 |
| 2012/0016678 A1* | 1/2012 | Gruber | G10L 13/02 704/275 |
| 2012/0066226 A1 | 3/2012 | Moshrefi et al. | |
| 2012/0084367 A1* | 4/2012 | Killoran, Jr | G06Q 10/063112 709/206 |
| 2012/0123975 A1* | 5/2012 | Lin | G06F 3/0484 706/11 |
| 2012/0191497 A1* | 7/2012 | Patterson | G06Q 10/06311 705/7.13 |
| 2012/0192090 A1* | 7/2012 | Patterson | G06Q 10/107 715/764 |
| 2012/0256832 A1* | 10/2012 | Honda | G06F 9/451 345/157 |
| 2013/0007648 A1* | 1/2013 | Gamon | G06Q 10/109 715/771 |
| 2013/0239000 A1* | 9/2013 | Parkinson | G06F 3/017 715/728 |
| 2014/0013244 A1* | 1/2014 | Lindsay | G06F 16/437 715/753 |
| 2014/0317502 A1* | 10/2014 | Brown | G06F 9/453 715/706 |
| 2014/0337751 A1 | 11/2014 | Lim et al. | |
| 2016/0062604 A1* | 3/2016 | Kraljic | G06F 3/04842 715/771 |
| 2016/0065509 A1* | 3/2016 | Yang | G06F 3/04886 715/752 |
| 2016/0349973 A1* | 12/2016 | Peevers | H04L 51/18 |
| 2017/0102915 A1 | 4/2017 | Kuscher et al. | |
| 2017/0116184 A1* | 4/2017 | Bradley | G06F 40/263 |
| 2017/0132019 A1* | 5/2017 | Karashchuk | G06F 3/0482 |
| 2017/0147154 A1* | 5/2017 | Steiner | G06F 3/013 |
| 2017/0185250 A1* | 6/2017 | Cho | G06F 3/0482 |
| 2017/0235465 A1* | 8/2017 | Marin | G06F 9/451 715/716 |
| 2018/0048865 A1* | 2/2018 | Taylor | G06Q 20/042 |
| 2018/0129995 A1 | 5/2018 | Fowler et al. | |
| 2018/0225263 A1* | 8/2018 | Zhong | G06F 40/166 |
| 2019/0129615 A1* | 5/2019 | Sundar | H04M 1/72451 |
| 2019/0132416 A1* | 5/2019 | Srinivasan | H04L 67/306 |
| 2019/0311714 A1* | 10/2019 | Barbello | G06F 40/58 |
| 2019/0371317 A1* | 12/2019 | Irani | G06F 16/90328 |
| 2019/0384460 A1* | 12/2019 | Harnisch | G06F 9/445 |
| 2019/0384621 A1* | 12/2019 | Chen | G06F 3/0482 |
| 2020/0019233 A1* | 1/2020 | Ikeda | G06K 9/00375 |
| 2020/0104802 A1* | 4/2020 | Kundu | G06F 16/90335 |

FOREIGN PATENT DOCUMENTS

| | | |
|---|---|---|
| CN | 105898069 | 8/2016 |
| CN | 106550090 | 3/2017 |
| JP | 2009-259144 | 11/2009 |
| JP | 2017-078965 | 4/2017 |
| JP | 2018-041462 | 3/2018 |
| KR | 10-2018-0074567 | 7/2018 |

OTHER PUBLICATIONS

Oracle, "Bronto Knowledge Base," Feb. 25, 2018, https://docs.oracle.com/cloud/bronto/BKBAS/BKBAS.pdf.*

Blundell, "How to use Outlook rules to easily organize your inbox," Aug. 18, 2017, https://www.windowscentral.com/how-manage-rules-outlook-and-take-back-your-inbox.*

Spencer, "How to Create Rules in MS Outlook to Auto Sort Emails," Feb. 2, 2018, https://business.tutsplus.com/tutorials/create-a-rule-in-outlook--cms-30424.*

Rosenberg et al. "SIP: Session Initiation Protocol," Network Working Group, Jun. 2002, RFC 3261, 269 pages.

Extended Search Report for European Patent Application No. 19187497.3, dated Oct. 14, 2019 8 pages.

Official Action with English Translation for China Patent Application No. 201910673904.3, dated Aug. 27, 2020 16 pages.

Official Action with English Translation for Japan Patent Application No. 2019-135907, dated Sep. 10, 2020 8 pages.

Official Action for European Patent Application No. 19187497.3, dated May 4, 2021 10 pages.

Official Action with English Translation for China Patent Application No. 201910673904.3, dated May 8, 2021 10 pages.

Official Action with machine translation for Japan Patent Application No. 2019-135907, dated Aug. 3, 2021 6 pages.

Official Action with English Translation for China Patent Application No. 201910673904.3, dated Nov. 3, 2021 11 pages.

* cited by examiner

SYSTEM AND METHOD FOR CREATING A CONTEXTUALIZED AFTER CALL WORKFLOW

BACKGROUND

With the advent of smartphones, the ability of a business to provide services to mobile users has increased dramatically. Even though the smartphone has provided users with the ability to access services at any time, there are several draw-backs associated with smartphones. For example, smartphones are hand-held devices that have a small display. The small display often makes it difficult to easily execute complex command sequences (i.e., a workflow) to achieve a desired result. For instance, if the desired result is to create a spreadsheet and then send the spreadsheet to a particular user, with the display size of the smartphone, it is difficult to create a complex spread sheet. Attaching the spreadsheet to the email also takes several additional steps. Conversely, it is much easier to implement this type of command sequence on a conventional desktop computer.

This problem is prevalent in industries that provide services, such as, in contact centers, sales industries, and repair/service industries. In many cases, the individuals who perform the services and handle the service calls may only have a smartphone. The ability to easily manage these types of services are often difficult with existing smartphone technologies because of the complex command sequences that are required using a small display.

SUMMARY

These and other needs are addressed by the various embodiments and configurations of the present disclosure. Data is received from one or more sensors in a first communication endpoint. The received data is related to a communication session between the first communication endpoint and at least a second communication endpoint. For example, the communication session may be a voice call between the first communication endpoint and the second communication endpoint. An action, a user, and a resource are identified based on the received data. A display is generated on the first communication endpoint that presents at least one of a simplified user interface command and a simplified user interface command builder. The simplified user interface command and the simplified user interface command builder are generated based on the identified user, action, and resource.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

As used herein, the term "participant" is used to identify a participant in a communication session (e.g., a voice call). However, the term "user" when discussed herein may also be considered a "participant."

When discussing elements in FIGS. 1-3, different elements may be represented with numbering from A-N. For example, in FIG. 1, the communication endpoints are defined as 101A-101N. This means that there may be any number of these elements from 1 to N, where N is an integer.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
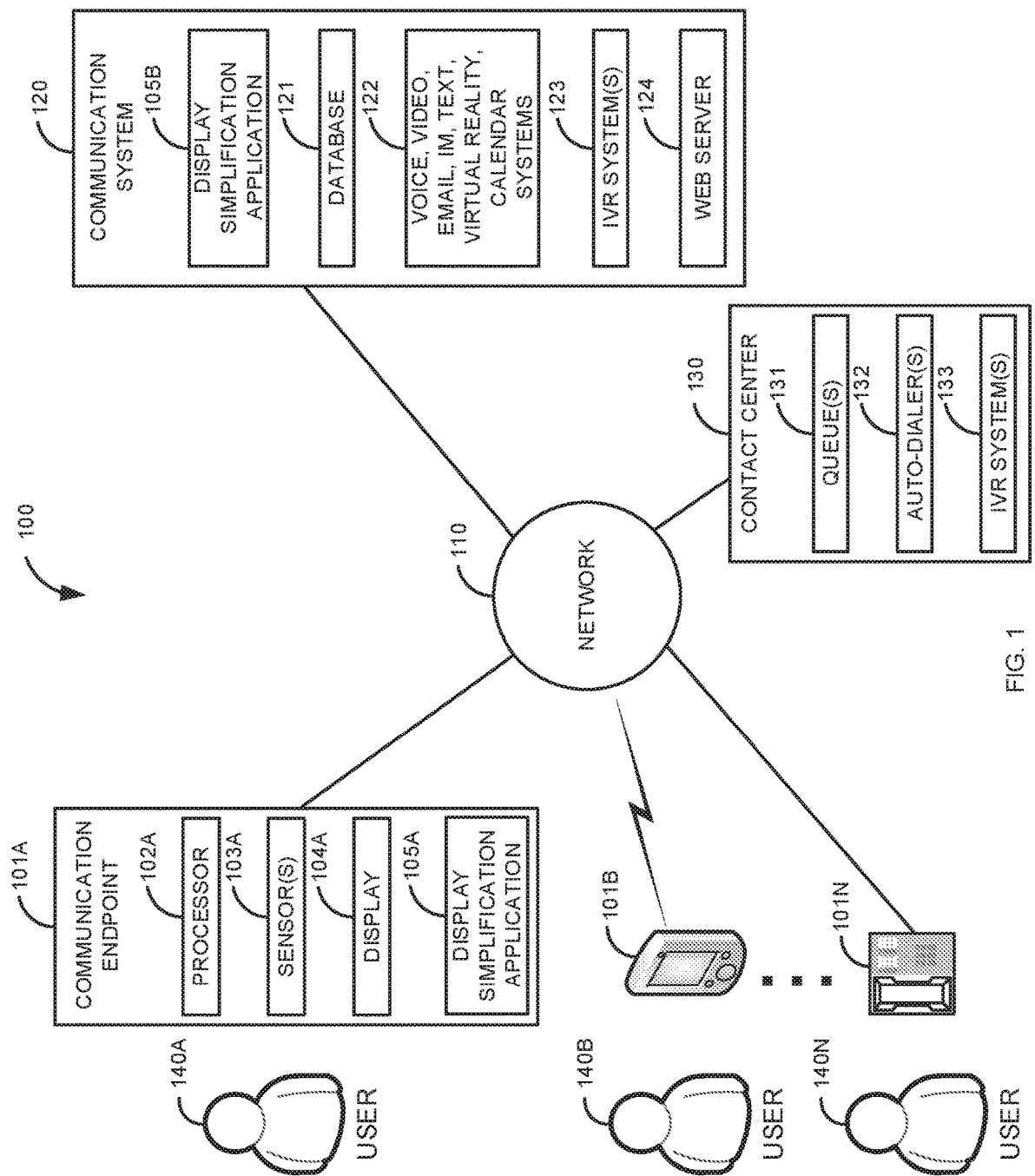
FIG. 1 is a block diagram of a first illustrative system for creating a contextualized after call workflow.

FIG. 1 is a block diagram of a first illustrative system 100 for creating a contextualized after call workflow. The first illustrative system 100 comprises communication endpoints 101A-101N, a network 110, a communication system 120, and a contact center 130. In addition, the communication endpoints 101A-101N are shown to have users 140A-140N.

The communication endpoints 101A-101N can be or may include any user communication endpoint device that can communicate on the network 110, such as a Personal Computer (PC), a telephone, a video system, a cellular telephone, a Personal Digital Assistant (PDA), a desktop computer, a tablet device, a notebook device, a smartphone, and the like. The communication endpoints 101A-101N are devices where a communication sessions ends. The communication endpoints 101A-101N are not network elements that facilitate and/or relay a communication session in the network, such as a communication manager or router. As shown in FIG. 1, any number of communication endpoints 101A-101N may be connected to the network 110.

The communication endpoint 101A comprises a processor 102A, sensor(s) 103A, a display 104A, and a display simplification application 105A. The communication endpoint 101A is typically a hand-held device such as a smartphone. Although not shown for convenience, the communication endpoints 101B-101N may comprise the elements 102-105.

The processor 102A can be or may include any hardware processor, such as a microprocessor, an application specific processor, a microcontroller, a multi-core processor, and/or the like. The processor 102A may send and/or receive information to/from the sensor(s) 103A, the display 104A, the display simplification applications 105A/105B, and the network 110.

The sensor(s) 103A can be or may include any kind of sensor, such as a microphone, a camera, a clock, an accelerometer, a GPS locator, thermometer/humidity sensor, a touch screen, a radio frequency detector, an altimeter, and/or the like. Data from the sensor(s) 103A can be processed by the processor 102A/display simplification application 105A. The data from the sensor(s) 103A may also be processed by the communication system 120/display simplification application 105B. Likewise, sensor(s) 103 in the communication devices 101B-101N may be processed by the display simplification applications 105A and/or 105B.

The display 104A can be or may include any kind of display, such as a Light Emitting Diode (LED) display, a LED, a plasma display, a liquid crystal display, a cathode ray tube, a lamp, a projector, and/or the like. If the communication endpoint 101A is a hand-held device, such as a smartphone, the display 104A is typically a smaller display 104A (e.g., less than 8 inches by 4 inches) that can be completely held in the hand. Because of the limited screen size, a hand-held communication endpoint 101 typically cannot display large amounts of information at a single time to a user 140. For example, a hand-held communication endpoint 101 may only be able to display a single window at a time.

The display simplification application 105A is used for creating a contextualized after call workflow that dramatically simplifies how a user can respond to various actions that are identified in a communication session (e.g., during a voice call). The display simplification application 105A dramatically reduces the number of steps (using the display 104) that a user (e.g., a user 140A) would have to take in order to perform an action.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), email protocols, video protocols, Instant Messaging (IM) protocols, text messaging protocols, and/or the like. Thus, the network 110 is an electronic communication network configured to carry messages via packets and/or circuit switched communications.

The communication system 120 can be or may include any hardware coupled with software that can manage/route communication sessions within the network 110, such as a Private Branch Exchange (PBX), a central office switch, a router, a proxy server, a session manager, a communication manager, an email server, an Instant Messaging (IM) server, a text messaging server, a virtual reality server, a calendar system, and/or the like.

The communication system 120 further comprises a display simplification application 105B, a database 121, a voice, video, email, IM, text, virtual reality, calendar system 122, an Interactive Voice Response (IVR) system 123, and a web server 124.

The display simplification application 105B is a server version of the display simplification application 105A. In one embodiment, the display simplification applications 105A/105B are distributed between the communication endpoint 101A and the communication system 120. In one embodiment, the display simplification application 105B is only in the communication system 120 (e.g., what is displayed on the communication endpoint 101A is done via the web server 124 in the communication system 120). Alternatively, the display simplification application 105A may be only in the communication endpoint 101.

The database 121 can be or may include any kind of database that can store information, such as, a relational database, a file system, a directory service, an object oriented database, and/or the like. Although not shown, the communication endpoint 101 may also have a database 121. In one embodiment, the database 121 may be located external to the communication system 120. The database 121 includes resources, such as documents, spreadsheets, pictures, videos, transcripts, files, applications, and/or the like.

The voice, video, email, IM, text, virtual reality, calendar system 122 can be or may include any system(s) that can provide one or more of voice, video, email, IM, text, virtual reality, calendar communications/events. For example, the voice, video, email, IM, text, virtual reality, calendar system 122 may only comprise a voice, an email, and a calendar system.

The IVR system(s) 123 can be or may include any hardware coupled with software that can provide a voice interaction with a user 140. The IVR system(s) 123 may provide various menus that allow the user 140 to navigate the IVR system 123. In one embodiment, the communication system 120 may not include the IVR system 123. The IVR system 123, as discussed herein, is a resource.

The web server 124 can be or may include any hardware coupled with software that can provide web services (e.g., web pages) to the communication endpoints 101A-101N. The web server 124 may provide web pages that are displayed to a user 140 on a communication endpoint 101 based on information provided by the display simplification application 105B. In one embodiment, the communication system 120 may not include the web server 124 (e.g., where the display simplification application 105A is only in the communication endpoint 101 or distributed between the communication endpoint 101 and the communication system 120).

The contact center 130 can be or may include any system that provides services to allow users 140A-140N to be connected to contact center agents. The contact center 130 is a resource that may be used by the display simplification application 105. The contact center 130 further comprises queue 131(*s*), auto-dialer(s) 132, and IVR system(s) 133.

The queue(s) 131 are contact center queue(s) that are used to hold communication sessions for the contact center 130. For example, the queue 131 may hold voice calls, video calls, emails, virtual reality calls, Instant Messaging (IM) calls, text messages, and/or the like. The communication sessions are held in the queue(s) 131 until a contact center agent is available to service the communication sessions.

The auto-dialer(s) 132 is a device that can automatically dial a communication endpoint 101A-101N. When answered by a user 140 the user 140 is connected to a contact center agent.

The IVR system(s) 133 may be similar or different from the IVR system(s) 123. For example, the IVR system(s) 133 may have menus and scripts specific to the contact center 130 while the IVR system(s) 123 may have menus and scripts specific to the communication system 120. The IVR system 133 as used herein is a resource.

The users 140A-140N can be or may include any user of the communication endpoints 101A-101N. The users 140A-104N may be participants in various types of communication sessions, such as, voice, video, email, text, IM, virtual reality, chat, and/or the like. For any give communication endpoint 101, there may be more than one user 140. For example, a communication endpoint 101 may have multiple users 140 that participant in a communication session (e.g., a conference call using a speaker phone) or use the communication endpoint 101 at different times.

Figure 2:
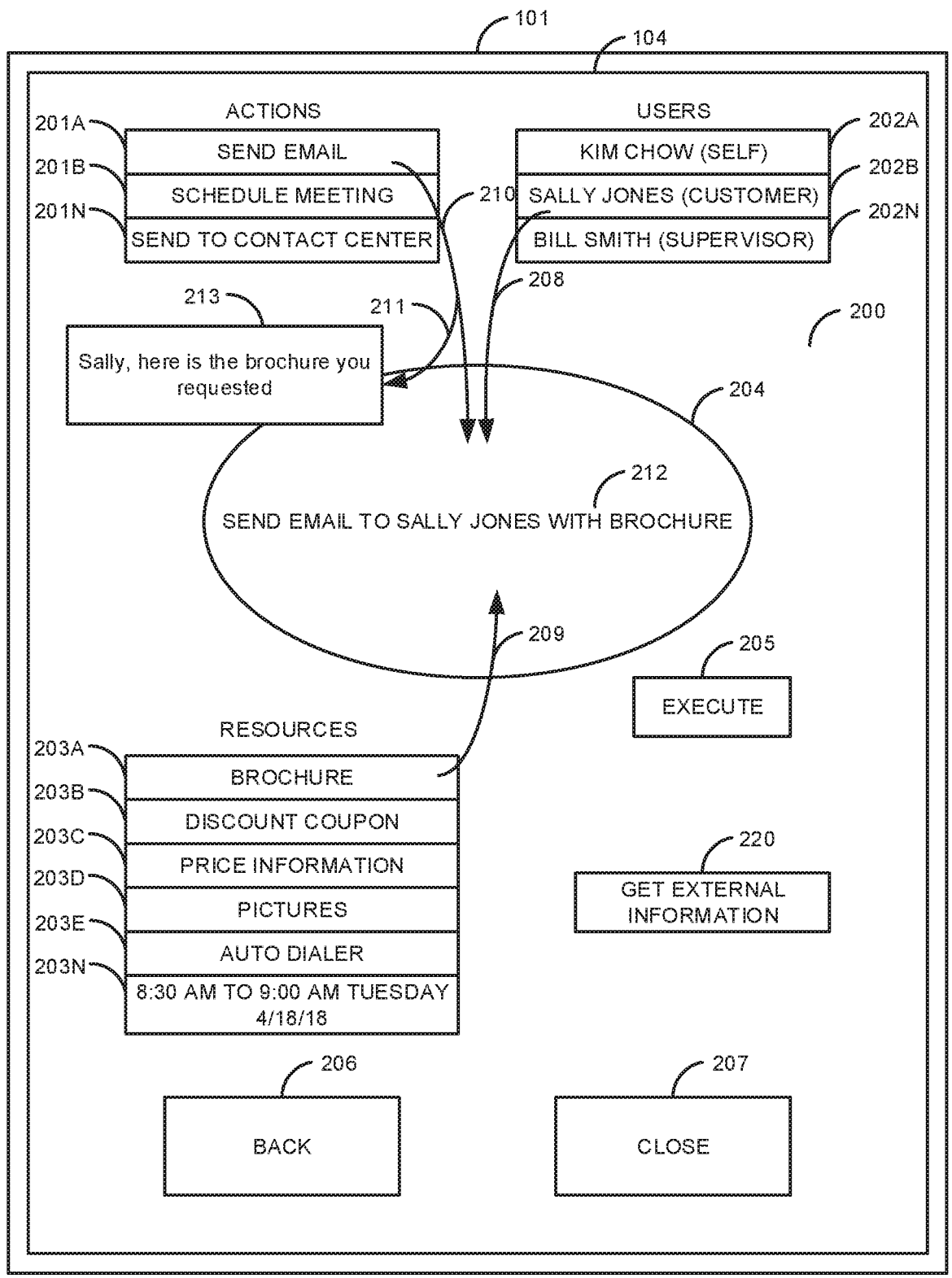
FIG. 2 is a diagram of a first user interface for displaying a simplified user interface command builder.

FIG. 2 is a diagram of a first user interface for displaying a simplified user interface command builder 200. The simplified user interface command builder 200 is an exemplary example, of what is displayed in the display 104 of a communication endpoint 101. The simplified user interface command builder 200 allows a user 140 to easily create actions based on the context of a previous and/or existing communication session.

For example, the user 140A (Kim Chow) of the communication endpoint 101A receives a voice call from the user 140B (Sally Jones) via the communication endpoint 101B. The user 140A (Kim Chow) is a salesman at a Ford™ dealership. The user 140B (Sally Jones) is a customer who inquiring in regard to purchasing a Ford Focus™. During the voice call, the user 140B (Sally Jones) requests to receive a brochure on the Ford Focus™. The user 140A (Kim Chow) says that he will send an email to the user 140B (Sally Jones) with the brochure (stored in the database 121). While talking to the user 140B (Sally Jones), the user 140A (Kim Chow) wants to make sure that he can give the user 140B (Sally Jones) a 10% discount that is currently being given by Ford™. The user 140A (Kim Chow) puts the call on hold and talks to his boss (Bill Smith, user 140N) on communication endpoint 101N. The user 140N (Bill Smith) tells the user 140A (Kim Chow) that the 10% discount is still available and that there is a 10% discount coupon (also stored in the database 121) that can be applied to a new car purchase of a Ford Focus™. The user 140N (Bill Smith) also asks the user 140A (Kim Chow) to schedule a review meeting next Tuesday in regard to a completely different issue. The user 140A (Kim Chow) takes the voice call off hold tells the user 140B (Sally Jones) that the 10% discount still applies and he will also send the 10% discount coupon. The voice call is then complete. The user 140A (Kim Chow) then takes two pictures of two different Ford Focus' that are currently on the lot using a camera (sensor 103A) in the communication endpoint 101A.

Based on the communication sessions (the voice calls between the user 101A (Kim Chow) and the users 101B (Sally Jones)/101N (Bill Smith)), the display simplification application 105 (105A and/or 105B) identifies action 201A (send an email), action 201B (schedule a meeting), and action 201N (send the user 140B's contact information to the contact center 130). The actions 201A-201N may be identified based on information/data in the communication session (e.g., voice, gestures, text (e.g. in an IM session)), rules (e.g., send the customer 140B's contact information to the contact center 130 based on the customer 140B receiving the discount coupon), and/or the like. For example, the display simplification application 105A and/or 105B can capture the voice streams sent via the communication endpoints 101A-101N sensors (103A-103N (microphones) and the pictures taken by the camera (sensor 103A) to generate the simplified user interface command builder 200. The actions 201A-201N may include other types of actions, such as, to generate a trouble ticket, to send a technician, to initiate a video call, to send a text message, to establish an IM session, forward a call to a contact center 130, and/or the like.

In one embodiment, the user 140A (Kim Chow) can add an action to the list of actions 201A-201N using a voice command or some other mechanism (e.g., a menu). For example, the user 140A (Kim Chow) can say "Make voice call." Based on the voice command, the action "Make voice call" is added to the list of actions 201A-201N.

The display simplification application 105 identifies the user 140B (Sally Jones), the user 140N (Bill Smith), and the user 140A (Kim Chow) to create a list of user items 202A-202N. In this example, the list of user items 202A-202N are participants in the communication sessions (the voice calls). However, the list of user items 202A-202N may include other users 140. For example, a supervisor (a user 140) in a contact center 130 (or a currently available contact center agent) may be identified and displayed in the list of user items 202A-202N based on a rule. Alternatively, a microphone in the communication endpoint 101 may have captured data that indicates that the user 140A (Kim Chow) talked face to face to another salesman (Jim Taylor) about handling the sale with the user 140B (Sally Jones). In this example, the user Jim Taylor 140 appears as a user 140 in the list of user items 202A-202N even though the user Jim Taylor 140 was not actually involved in any of the voice calls.

In one embodiment, the user 140A (Kim Chow) can use a voice command or other type of command (e.g., via a menu) and dynamically add a user 140 to the list of user items 202A-202N. For example, the may say "Add Jim Taylor to the list of users" to add the user Jim Taylor 140 to the list of user items 202A-202N.

The display simplification application 105 identifies the resource 203A (the brochure), the resource 203B (the discount coupon), the resource 203C (price information based on the 10% discount for the two Ford Focus' in the pictures), the resource 203D (the two pictures of the Ford Focus'), the resource 203E (an auto-dialer 132 that is in the contact center 130), and the resource 203N (a time period to schedule a meeting based on availability of the user 140A (Kim Chow) and the user 140N (Bill Smith) on Tuesday). The resources 203A-203N are identified based on the communication sessions (voice calls), other communications, and/or rules. For example, the resources 203A-203D and 203N were all identified based on the conversation that occurred in the voice calls. Alternatively, the resource 203E (the auto-dialer 132) may be identified based on a rule that Sally Jones is likely to make a purchase. The resources 203A-203N may comprise other resources, such as, the queue(s) 131, the IVR system(s) 123/133, a technical specialist, an application (e.g., to connect the user 140 to a web application), and/or the like.

Based on the actions 201A-201N, the list of user items 202A-202N, and the resources 203A-203N, the user 140A (Kim Chow) can then drag-and-drop one or more actions 201A-201N, one or more user items 202 from the list of user items 202A-202N, and one or more resources 203A-203N onto the spotlight area 204. For example, as shown in FIG. 2, the user 140A (Kim Chow) drags-and-drops the send email action 201A (step 210), the user item 202B (Sally Jones, step 208), and the brochure resource 203A (step 209) onto the spotlight area 204. The user 140A (Kim Chow) can then select the execute button 205 to send an email to Sally Jones (using the email, system 122) with the brochure 203A (assuming that the display simplification application 105 has the email address of Sally Jones (otherwise the user 140A (Kim Chow) will be asked to enter the email address of Sally Jones).

The action text 212 changes dynamically as the user 140A (Kim Chow) drags-and-drops different action(s) 201, user item(s) 202, and resource(s) 203 onto the spotlight area 204. For example, if the user 140A (Kim Chow) drags-and-drops the action 201A onto the spotlight area 204 in step 210, the action text 212 would say "Send email." When the user 140A (Kim Chow) drags-and-drops the user item 202B (Sally Jones) onto the spotlight area 204 in step 208, the action text 212 would say "Send email to Sally Jones." When the user 140A (Kim Chow) drags-and-drops the brochure resource 203A onto the spotlight area 204 in step 209, the action text 212 would say "Send email to Sally Jones with Brochure." Although the action text 212 is described above in a specific order, the action text 212 does not require steps 208-210 to occur in the above described order.

Although not shown in FIG. 2, the user 140A (Kim Chow) can drag-and-drop additional actions 201, user items 202, and/or resources 203 into the spotlight area. For example, the user 140A (Kim Chow) may drag-and-drop the resource 203B (discount coupon), the resource 203C (price information), and the resource 203D (the pictures) onto the spotlight area 204 and then select the execute button 205. In this case, the resources 203A-203D are sent as attachments in the email that is sent to the user 104B (Sally Jones).

As the user 140A (Kim Chow) drags-and-drops the additional resources 203B-203D onto the spotlight area, the action text 212 will continue to dynamically change. For example the action text 212 would say "Send email to Sally Jones with brochure, discount coupon, price information, and pictures."

When the user 140A (Kim Chow) selects the action 201A to send the email, the simplified user interface builder 200 can display a suggested text of the email 213 in step 211. Like the action text 212, the suggested text of the email 213 can change dynamically based on what actions 201A-201N, user items 202A-202N, and resources 203A-203N have been dragged-and-dropped into the spotlight area 204. For example, if the user 140A (Kim Chow) added the discount coupon resource 203B, the suggested text of the email 213 would state "Sally, here is the brochure and discount coupon you requested." The user 140A (Kim Chow) may also be able to change the suggested text of the email 213.

Once the user 104A (Kim Chow) has selected the execute button 205, the user 140A (Kim Chow) may execute other actions 201A-202N. For example, the user 140A (Kim Chow) could drag-and-drop the schedule meeting action 201B and then drag-and-drop the user item 202N (Bill Smith) and the resource 203N (a time available for both Kim Chow 140A and Bill Smith 140N) into the spotlight area 204. In this example, the action text 212 would say "Schedule meeting with Bill Smith next Tuesday at 8:30 AM for ½ hour." The user 140A (Kim Chow) could then select the execute button 205 to perform the action of scheduling the meeting (using the calendar system 122) with the user Bill Smith 140N.

The user 140A (Kim Chow) could then perform another action 201. For example, the user 140A (Kim Chow) could drag-and-drop the send to the contact center action 201N, the user item 202B (Sally Jones), and the auto-dialer resource 203E onto the spotlight area 204 and then hit the execute button 205. This would cause an auto-dialer 132 in the contact center 130 to auto-dial the user 140B (Sally Jones) to have Sally Jones 140B connected to a contact center agent. For example, the user 140A (Kim Chow) may have discussed during the voice call with user 140B (Sally Jones) that he would have an expert contact Sally Jones 140B to discuss financing options.

As discussed above, the user 140A (Kim Chow) took two pictures. The user 140A (Kim Chow) could add the pictures by selecting the get external information button 220 and then browse to the pictures to add the picture resource 203D to the list of resources 203A-203N. In one embodiment, the display simplification application automatically adds the picture resource 203D based on the context of the voice communication sessions.

The user 140A (Kim Chow) can also select the back button 206 to go back to a main menu (not shown) of the simplified user interface command builder 200. The user 140A (Kim Chow) can close the simplified user interface command builder 200 by selecting the close button 207.

The simplified user interface command builder 200 dramatically reduces the number of steps that are necessary to implement an action. For example, the action 201A to send the email to the user 140B (Sally Jones) with the brochure 203A, the discount coupon 203B, the price information 203C, and the pictures 203D would take a lot more steps and time using traditional user interfaces. To implement this simple process using a traditional user interface, the user 140A (Kim Chow) would have to open up the email system, select to send an email, find the user 140B (Sally Jones), find and attach the brochure, find and attach the discount coupon, use a calculator to determine the price information for both of the Ford Focus', create a document with the price information (e.g. a spread sheet, that may not likely be on the communication endpoint 101A), attach the price information to the email, attach the pictures, and then send the email. In this example, the user 140A (Kim Chow) would have to open up multiple applications (email/spreadsheet)/windows and navigate to multiple places to attach the various documents/pictures. The user 140A (Kim Chow) may have to use another device, such as a personal computer to calculate the price information. The simplified user interface command builder 200 allows the user 140A (Kim Chow) to implement the email action in a matter of seconds when in the past the same action would have taken much longer to complete.

Figure 3:
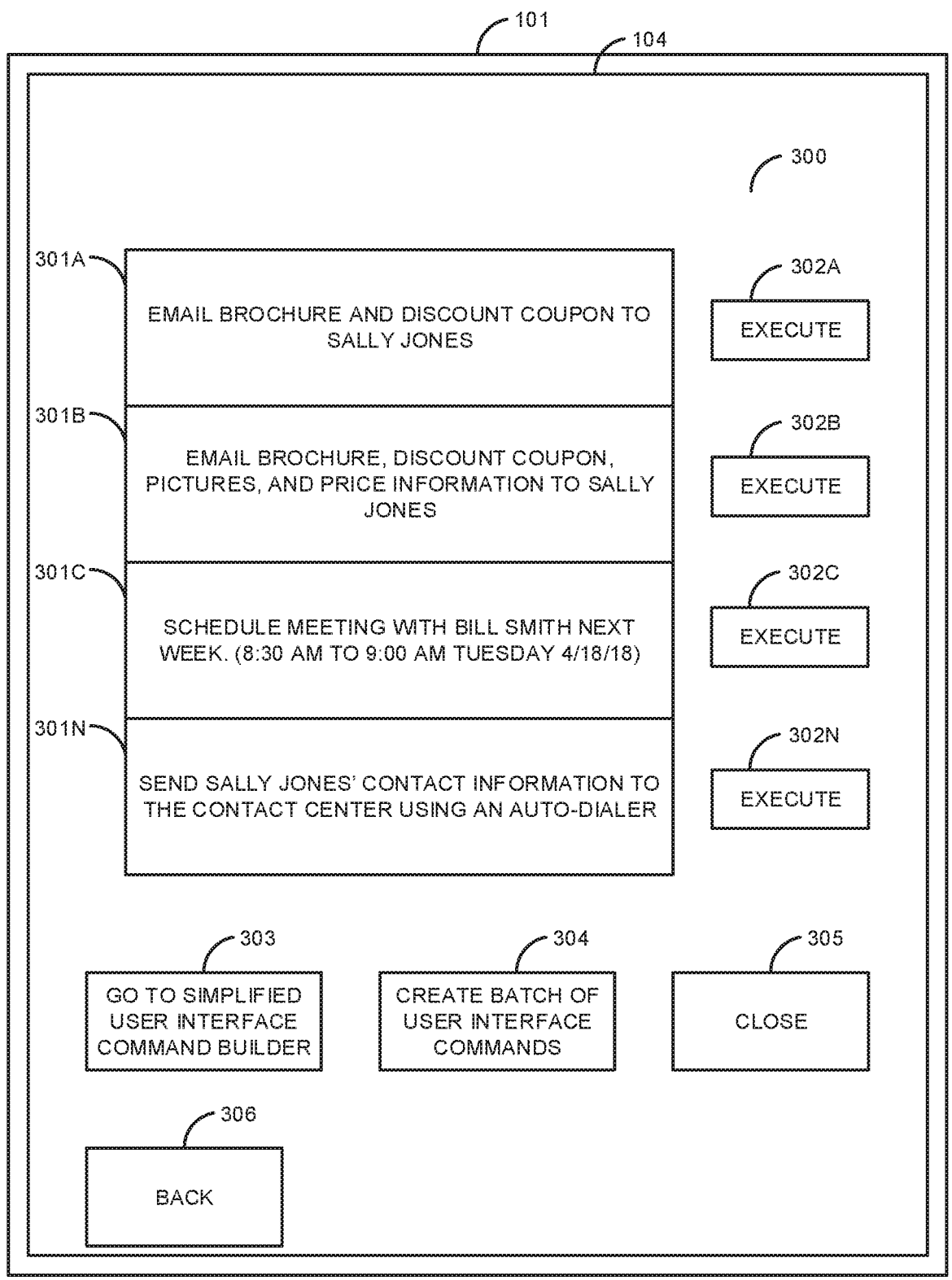
FIG. 3 is a diagram of a second user interface for displaying simplified user interface commands.

FIG. 3 is a diagram of a second user interface 300 for displaying simplified user interface commands 301A-301N. The second user interface 300 is shown in a display 104 of a communication endpoint 101. The second user interface 300 comprises simplified user interface commands 301A-301N, execute buttons 302A-302N, a go to simplified user interface command builder button 303, a create batch of user commands button 304, a close button 305, and a back button 306.

The second user interface 300 further simplifies the number of steps necessary to implement an action 201. The simplified user interface command 301A is to email (action 201A) the brochure (resource 203A) and the discount coupon (resource 203B) to the user 140B (Sally Jones). To implement the simplified user interface command 301A, the user 140A (Kim Chow) can select the execute button 302A.

The simplified user interface command 301B is to email the brochure (resource 203A), the discount coupon (resource 203B), the pictures (resource 203D), and the price information (resource 203C) to the user 140B (Sally Jones). To implement the simplified user interface command 301B, the user 140A (Kim Chow) can select the execute button 302B.

The simplified user interface command 301C is to schedule a meeting (action 201B) with user 140N (Bill Smith) at 8:30 AM to 9:00 AM next Tuesday Apr. 14, 2018 (resource 203N). To implement the simplified user interface command 301C, the user 140A (Kim Chow) can select the execute button 302C.

The simplified user interface command 301N is to send Sally Jones' (user 140B) contact information to the contact center 130 (action 201N) and use the auto-dialer 132 (resource 203E) to contact Sally Jones. To implement the simplified user interface command 301N, the user 140A (Kim Chow) can select the execute button 302N. In one embodiment, a delay may be associated with the simplified user interface command 301N. For example, a delay of 24 hours may be associated with the simplified user interface command 301N.

In one embodiment, as the user 140A (Kin Chow) selects an execute button 302, the respective simplified user interface command 301/execute button 302 are removed (or greyed out and made non-selectable) from the user interface 300.

The user 140A (Kim Chow) can select the go to simplified user interface command builder button 303 to go the simplified user interface command builder 200 that is shown in FIG. 2. The user 140A (Kim Chow) can close the user interface 300 by selecting the close button 305 or go back to the previous user interface by selecting the back button 306.

The user 140A (Kim Chow) can also create a batch of simplified user interface commands 301 by selecting the create batch of user interface commands button 304. For example, the user 140A (Kim Chow) may have multiple communication sessions throughout the day regarding different customers. The user 140A (Kim Chow) can then select the create batch of user interface commands button 304 to send the simplified user interface commands 301A-301N to another communication endpoint 101 (e.g., a personal computer) for various communication sessions held throughout the day. At the end of the day, the user 140A (Kim Chow) can the select individual simplified user interface commands 301 to execute on the other communication endpoint 101. For example, the user 140A (Kim Chow) may have multiple voice calls during the day from different customers regarding different cars. The batch of simplified user interface commands may be completely unrelated.

The simplified user interface commands 301 may be based on an action or trouble ticket. For example, the communication session may be between a customer 140 and a contact center agent about sending a technician to service a TV at a specific time. The simplified user interface command 301 would be to submit an action card (the action 201) to send a technician (the resource 203) to the customer (the user 140).

Figure 4:
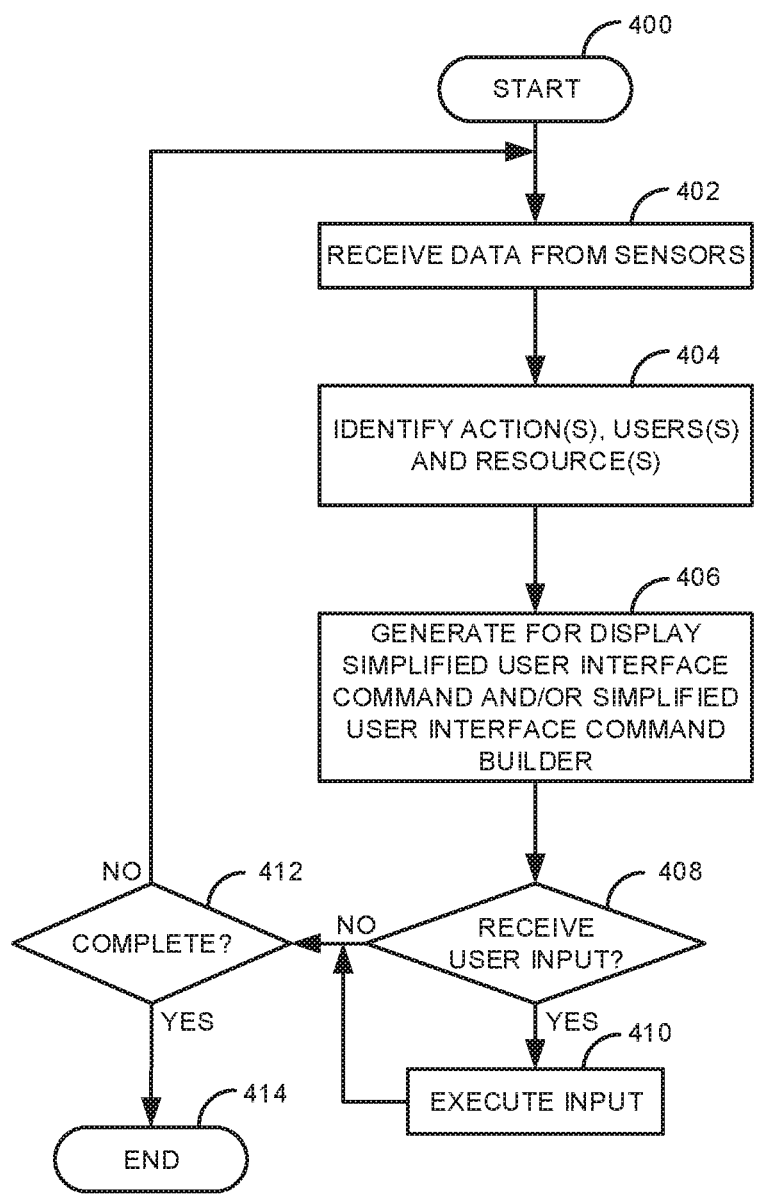
FIG. 4 is a flow diagram of a process for creating a contextualized after call workflow.

FIG. 4 is a flow diagram of a process for creating a contextualized after call workflow. Illustratively, the communication endpoints 101A-101N, the sensors 103, the display 104, the display simplification applications 105A-105B the communication system 120, the database 121, the voice, video, email, IM, text, virtual reality, calendar systems 122, the IVR system(s) 123, the web server 124, the contact center 130, the queue(s) 131, the auto-dialer(s), 132, and the IVR system(s) 133 are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 400. The display simplification application 105 retrieves data from the sensors 103 in step 402. For example, the display simplification application 105 can retrieve GPS location information for the communication endpoint 101, pictures, voice data (e.g., identify spoken words, phrases, background sounds (e.g., dogs barking), and/or the like), video data (e.g., identify users, objects, (e.g., a car), and/or gestures in the video data), temperature data, time data, altitude data, motion data (e.g., from an accelerometer), and/or the like. The received data may come from sensors 103 in other communication endpoints 101 or devices. For example, the received data may come from a sensor 103 in another communication endpoint 101 (e.g., a microphone or camera). The sensor 103 may be in another device, such as a security system, an RFID scanner, barcode reader, a remote camera, a pressure sensor, a radio frequency detector, a printer, and/or the like.

The display simplification application 105 identifies, in step 404, action(s) 201, user(s) 140, and resource(s) 203. The actions 201 can be a variety of actions, such as, send an email, initiate a voice call, initiate a video call, initiate an IM session, initiate a virtual reality session, send a text message, notify an entity and/or person, schedule a meeting, perform a process (e.g., start a car, trigger an alarm), send information, schedule technician, generate a trouble ticket, display information on a device, and/or the like.

The users 140 can be identified from a communication session, such as voice call, a video call, an IM session, a text message, an email, a virtual reality communication session, a text message, and/or the like. The users 140 can be identified outside a communication session, identified in a picture or video, identified by a voice print, identified by facial recognition, identified based on a login, identified based on a RFID scan, identified based on a biometric scan, and/or the like.

The resources 203 can be identified in various ways, such as, based on a face to face conversation, a picture (e.g., identifying a book and/or title of a book based on a picture of the book), a video, a scan of a barcode, voice of a communication session, video of a communication session, text of a text message, text of an IM session, a gesture (e.g., a user 140 pointing to an object, such as a specific type of car) made in a video and/or a communication session, an object in a picture or video (e.g., a car in a picture), a direction of movement (e.g., a person is moving toward an object (a resource), and/or the like. The resources 203 can be or may include any type of resource 203 used by the user 140, such as, a document, a video, a picture, an email, a text message, a device (e.g., a IVR system 123/133, a queue 131, an auto-dialer 132, etc.), a voicemail, an audio/video recording (e.g., a music file), an application (e.g., a software application), a product, a service, a contract, and/or the like.

The display simplification application 105 generates for display, simplified user interface command(s) 301 and/or a simplified user interface command builder 200 in step 406. For example, the user interface command(s) 301A-301N as shown in FIG. 3 and the simplified user interface command builder 200 as shown in FIG. 2.

The display simplification application 105 determines, in step 408 if there has been user input. For example, if the user 140 has selected one of the execute buttons 205/302A-302N. If the display simplification application 105 has received input in step 408, the input is executed in step 410 and the process goes to step 412. If there is no input in step 408 the process goes to step 412. The display simplification application 105 determines, in step 412, if the process is complete. If the process is complete in step 414, the process ends in step 414. Otherwise, the process goes back to step 402.

Figure 5:
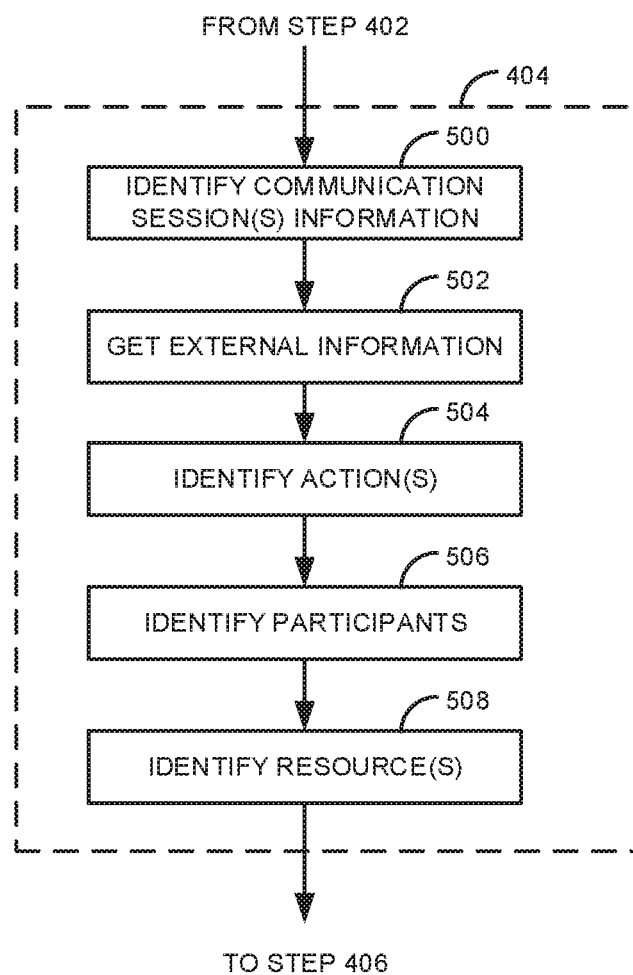
FIG. 5 is a flow diagram of a process for identifying action(s), participant(s) and resource(s) in a contextualized after call workflow.

FIG. 5 is a flow diagram of a process for identifying action(s) 201, user(s) 140 and resource(s) 203 in a contextualized after call workflow. The process of FIG. 5 is an exemplary embodiment of step 404 of FIG. 4. After receiving data from the sensors 103 in step 402, the display simplification application 105 identifies, in step 500, communication session(s) information. For example, as discussed in FIG. 2, the communication session(s) may be multiple communication sessions. In addition, the identified communication sessions may be in different medias (e.g., voice, video, email, IM, text, virtual reality, etc.). For example, the identified communication sessions may be a voice call and an email that was first sent that caused the voice call to be initiated. The identified communication sessions may occur over a time period, at the same time, and/or the like. The identified communication sessions may be identified based on key words, users 140, timing (e.g., one communication session is initiated immediately after another communication sessions ends), and/or the like.

The identified communication sessions may include a communication session(s) with a non-user. For example, the identified communication session may be an interaction with the IVR system 123/133, an interaction with a voicemail system, an interaction with an automated IM attendant, and interaction with a web page provided by the web server 124, and/or the like.

The display simplification application 105 gets the external information in step 502. For example, as discussed above, the user 140 can provide the external information using the get external information button 220. The external information may comprise multiple types of information. For example, the external information may be a resource 201, a person, 140, and/or an action 203.

The display simplification application 105 then identifies the action(s) in step 504, identifies the participants in step 506, and identifies the resource(s) in step 508. The process then goes to step 406.

Examples of the processors 102 as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that program the microprocessor to:
   receive data from one or more sensors in a first communication endpoint, the received data being related to a first communication session between the first communication endpoint and at least a second communication endpoint, wherein at least a portion of the received data is a voice stream from the first communication session;
   identify, based on the received data, at least one of each of: a first action, a first user, and a first resource;
   identify a second user, wherein identifying the second user is based on the portion of the received data that is received from the one or more sensors during the first communication session; and
   generate, on the first communication endpoint, at least one of a first simplified user interface command and a simplified user interface command builder, wherein the at least one of the first simplified user interface command and the simplified user interface command builder are generated using a relationship between the first user, the first action, and the first resource.

2. The system of claim 1, wherein generating the at least one of the first simplified user interface command and the simplified user interface command builder comprises generating the simplified user interface command builder, and wherein the simplified user interface command builder provides an option, selectable by a user, to provide the first simplified user interface command that is based on a selected relationship between at least two of the first user, the first action, and the first resource.

3. The system of claim 1, wherein the first communication session comprises a second communication session with a third communication endpoint, wherein the second communication session is related to the first communication session and wherein at least one of the first action, the first user, and the first resource are identified based on the second communication session.

4. The system of claim 3, wherein generating the at least one of the first simplified user interface command and the simplified user interface command builder comprises generating the first simplified user interface command, wherein the relationship is configured by a user of the first communication endpoint, wherein generating the first simplified user interface command comprises generating at least a second simplified user interface command, wherein the second simplified user interface command is generated based only on the second communication session, and wherein the second simplified user interface command is generated based on a second action in the second communication session that is unrelated to the first action.

5. The system of claim 1, wherein generating the at least one of the first simplified user interface command and the simplified user interface command builder comprises generating the first simplified user interface command, and wherein after generating the first simplified user interface command, a user of the first communication endpoint selects to generate the simplified user interface command builder by selecting an option of the first simplified user interface command, and providing the simplified user interface command builder after selecting the option.

6. The system of claim 1, wherein generating the at least one of the first simplified user interface command and the simplified user interface command builder comprises generating the simplified user interface command builder, and wherein the simplified user interface command builder allows a user of the first communication endpoint to select at least two of the first action, the first user, and the first resource to select the relationship to generate and provide the first simplified user interface command based on the selected relationship.

7. The system of claim 1, wherein the generating the at least one of the first simplified user interface command and the simplified user interface command builder comprises generating the simplified user interface command builder, and wherein the simplified user interface builder provides a command to get an external resource, wherein the external resource is external to the system.

8. The system of claim 1, wherein generating the at least one of the first simplified user interface command and the simplified user interface command builder comprises generating the simplified user interface command builder, wherein a user selects the relationship, wherein the first action comprises sending an email, and wherein a suggested text of the email is dynamically presented to the user based on the user selecting the relationship.

9. The system of claim 1, wherein generating the at least one of the first simplified user interface command and the simplified user interface command builder comprises generating the simplified user interface command builder, wherein the simplified user interface command builder comprises a display of the first action, the first user, and the first resource at a same time on the first communication endpoint, wherein a user of the first communication endpoint can drag-and-drop the first user, the first action, and the first resource that are displayed at the same time on the display to configure the simplified user interface command builder, and wherein the user creates a batch of simplified user interface commands for display at a same time on the display on the first communication endpoint based on a plurality of separate communication sessions that are unrelated and that include the first communication session.

10. The system of claim 1, wherein at least a first portion of the received data is a voice stream from the first communication session, and wherein the identifying the first user is based on at least a second portion of the received data that is received from the one or more sensors during the first communication session.

11. The system of claim 1, wherein the second user is not a participant in the first communication session.

12. A method comprising:
receiving data from one or more sensors in a first communication endpoint, the received data being related to a first communication session between the first communication endpoint and at least a second communication endpoint;
identifying, based on the received data, at least one of each of: a first action, a first user, and a first resource, wherein at least a portion of the received data is a voice stream from the first communication session;
identifying a second user, wherein identifying the second user is based on the portion of the received data that is received from the one or more sensors during the first communication session; and
generating, on the first communication endpoint, a first simplified user interface command based on a relationship between the first user, the first action, and the first resource, wherein the first simplified user interface command provides an option, selectable by a user of the first communication endpoint, to provide a simplified user interface command builder comprising an option to select one of at least two relationships between the first user, the first action, and the first resource.

13. The method of claim 12, wherein the first user, the first action, and the first resource are displayed at a same time on a display of the first communication endpoint, and wherein the simplified user interface command builder is provided and comprises generating an action text displayed on the display, and further comprising receiving, after the generating based on the relationship, a user selection of at least one of the first user, the first action, and the first resource, wherein the action text on the display changes based on the user selection to display an updated relationship between the first user, the first action, and the first resource based on the user selection.

14. The method of claim 11, wherein at least the portion of the received data is received from the one or more sensors during the first communication session.

15. The method of claim 12, wherein the simplified user interface command builder is provided, and further comprising adding, by a user of the first communication endpoint, a second action to the simplified user interface command builder after the simplified user interface command builder is provided and displaying the second action on the simplified user interface command builder.

16. The method of claim 12, wherein the received data comprises data related to a second communication session and a third communication session, wherein at least one of the second and the third communication sessions is between the first communication endpoint and a third communication endpoint, and wherein the received data is related to the second and the third communication sessions.

17. The method of claim 12, wherein at least one of the one or more sensors is an imaging sensor, and wherein at least one of the first action, the first user, and the first resource is identified based on data received from the imaging sensor.

18. The method of claim 12, wherein the second user is not a participant in the first communication session.

19. A hand-held communication endpoint comprising:
a microprocessor;
one or more sensors;
a display; and
a computer readable medium, coupled with the microprocessor and comprising microprocessor readable and executable instructions that program the microprocessor to:
receive data from the one or more sensors, the received data being related to a first communication session between the hand-held communication endpoint and at least a second communication endpoint, wherein at least a portion of the received data is a voice stream from the first communication session;
identify, based on the received data, at least one of each of: a first action, a first user, and a first resource;
identify a second user, wherein identifying the second user is based on the portion of the received data that is received from the one or more sensors during the first communication session; and
generate at least one of a first simplified user interface command and a simplified user interface command builder, wherein the at least one of the first simplified user interface command and the simplified user interface command builder are derived from a relationship between the first user, the first action, and the first resource.

20. The hand-held communication endpoint of claim 19, wherein the second user is not a participant in the first communication session.

* * * * *